No. 841,155. PATENTED JAN. 15, 1907.
O. KELLY.
TIRE PROTECTOR.
APPLICATION FILED NOV. 18, 1905.

Witnesses:

Orin Kelly, Inventor,
by Attorneys.

UNITED STATES PATENT OFFICE.

ORIN KELLY, OF ORETON, OHIO.

TIRE-PROTECTOR.

No. 841,155.     Specification of Letters Patent.     Patented Jan. 15, 1907.

Application filed November 18, 1905. Serial No. 288,009.

*To all whom it may concern:*

Be it known that I, ORIN KELLY, a citizen of the United States, residing at Oreton, in the county of Vinton and State of Ohio, have invented a new and useful Rubber Tire, of which the following is a specification.

This invention relates generally to rubber tires, and particularly to a novel form of shield to protect the tire against wear and liability of puncture.

The object of the invention is to provide a shield which shall be non-puncturable in character and which may be readily applied either to a pneumatic or to a cushion tire and which will in use render the tire non-skidding and non-slipping.

With the above and other objects in view, as will appear as the nature of the invention is better understood, the same consists in the novel form of tire-shield, as will be hereinafter fully described and claimed.

Figure 1:
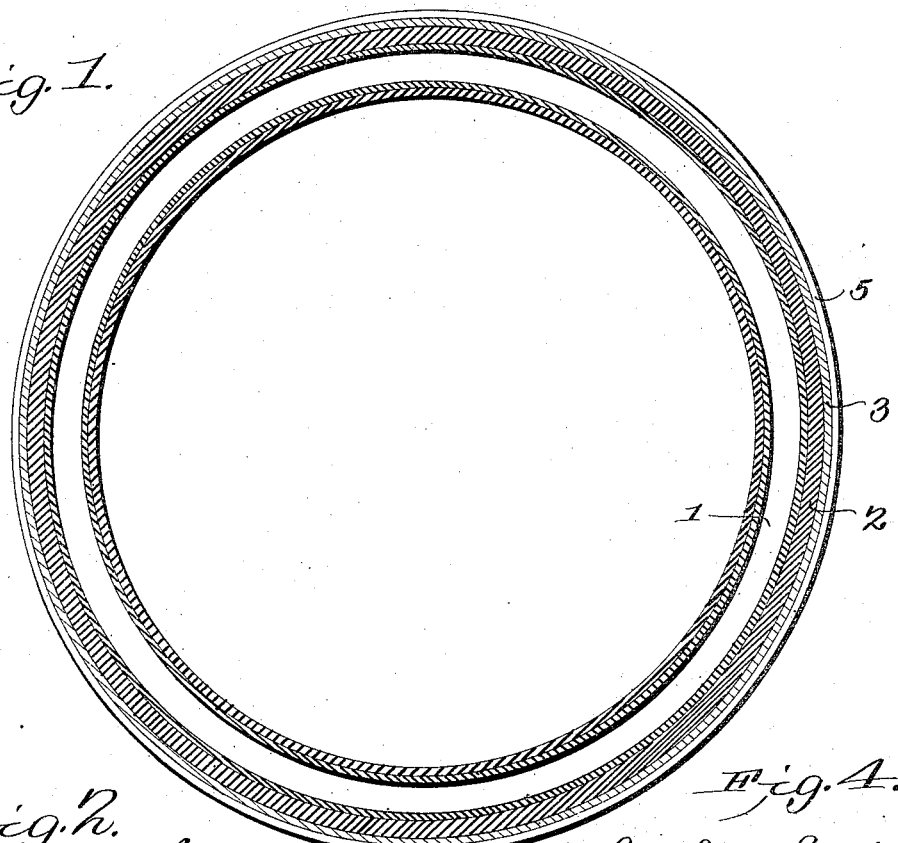
Figure 2:
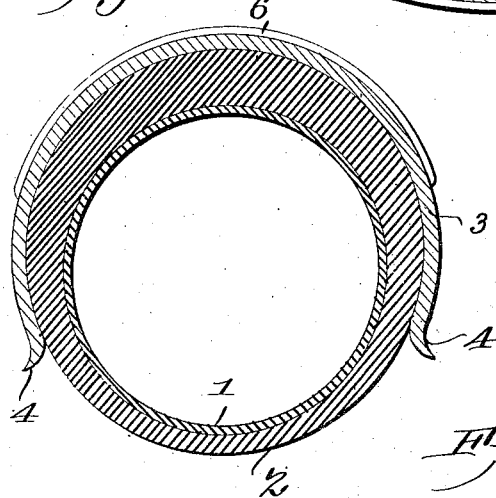
Figure 4:
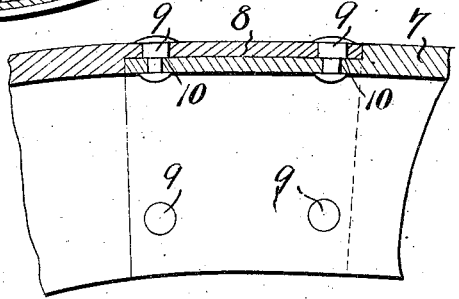
Figure 3:
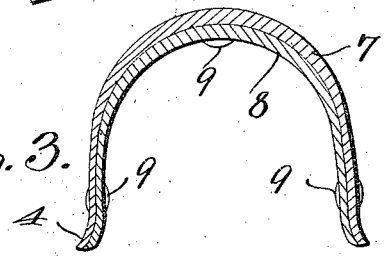

In the accompanying drawings, forming a part of this specification, and in which like characters of reference indicate corresponding parts, Figure 1 is a view in vertical longitudinal section through a pneumatic tire equipped with the improvement of the present invention. Fig. 2 is a view in transverse section through a pneumatic tire, showing a slightly-modified form of shield combined therewith. Fig. 3 is a transverse sectional view through a form of shield adapted for use in connection with cushion-tires. Fig. 4 is a view in vertical longitudinal section through the shield shown in Fig. 3.

Referring to the drawings and to Figs. 1 and 2 thereof, 1 designates the inner or air tube of a pneumatic tire, and 2 the outer sheath or tube. These parts may be of the usual or any preferred construction, and therefore need no detailed description.

The novelty of the invention resides in combining with the sheath a metallic shield 3, which is preferably made of sheet-steel rolled or otherwise formed accurately to fit the exterior of the sheath, the edges 4 of the shield being preferably outturned, as shown in Figs. 2 and 3, in order to prevent any cutting of the sheath should the same become deflated, or the edges of the shield may extend either as a whole or scalloped or projecting portions thereof sufficiently far to cover and protect the edges of the rim of the wheel and to prevent the tire from leaving the wheel by the skidding effect on short turns.

In order to increase the holding qualities of the shield, so as to render the tire non-skidding and non-slipping, its periphery may be provided with longitudinal corrugations 5, as shown in Fig. 1, with transverse corrugations 6, as shown in Fig. 2, or these corrugations may be obliquely disposed relatively to the face of the shield and still be within the scope of the invention, or when desirable, as in the case of heavy vehicles, the shields may be provided with studs, spikes, or laps for increasing the tractive effect. Of course it will be understood that with light vehicles, such as small automobiles, the "traction" devices, by which term may be included either the corrugations, as shown, or studs or spikes may be omitted, in which case a smooth shield will be thoroughly effective in protecting the tire against wear, and also against danger of puncture.

In the form of the invention shown in Figs. 1 and 2 the shield is endless, the terminals being united in any suitable manner, as by being brazed or welded together, and this form of the invention is particularly adaptable for use upon pneumatic tires, as by deflating the tire the shield may readily be positioned thereon, after which the tire may be inflated, and thus secure the shield in position. This form of the invention is also adapted for use on solid or cushion tires, as it will be combined with them before they are placed upon the rim of the wheel; but where it is impracticable to remove the rubber tire the form of the invention shown in Fig. 4 is employed in which the terminals of the shield 7 are formed with a lap-joint 8, the members of which are held combined by a rivet or rivets 9, or a small bolt may be employed in lieu of the rivets. Where rivets are used, the part of the rivet in the top or outside lap is made larger in diameter than the part that penetrates the inside lap, so that the rivet fits with a shoulder 10 on the outside of the inner lap, making it an easy matter to fasten these rivets securely in the inner lap of the shield before placing the same upon the wheel. The shield is then positioned on the tire and the ends are brought together, the heads of the rivets being received by orifices in the outer lap of the shield. The heads are then upset or beaded over, the shoulders 10 preventing the rivets from being driven through the inner lap. As stated, these shields are made to fit the tires with which they are to be combined, and it will generally be advisable or preferable to supply the shield with the tire; but when the tires of a vehicle are practically worn out shields such as described may be applied thereto, and thus practically renew them.

Owing to the fact that the shield is semicircular in cross-section and embraces the greater portion of the diameter of the tire it will not yield or flatten out the point of contact with the ground, whereby the so-called "hill-climbing" is prevented, thus conserving energy and power that would otherwise be wasted in overcoming this tendency.

As the shield is capable of being readily placed in position or removed from the wheel, it can be used with high advantage on such cushion-tired vehicles as buggies, &c., during the periods of bad weather to prevent the well-known ruinous effect of muddy roads on such tires.

The improvements herein defined while simple in character will be found thoroughly efficient in use for the purposes designed, and may readily be applied to a tire already in use without necessitating any change whatever in its structural arrangement.

I claim—

1. In a vehicle-wheel the combination with a rubber tire, of a metallic shield engaging the tread-surface of the tire with its opposite longitudinal edges embracing approximately three-fourths of the exterior surface of said tire and curved outwardly to produce laterally-extending flanges, the adjacent ends of the shield being provided with shoulders defining reduced perforated extensions which overlap and bear against said shoulders, and fastening devices passing through the perforations in the overlapping ends of the shield.

2. In a vehicle-wheel, the combination with a rubber tire, of a metallic shield engaging the tread-surface of the tire with its opposite longitudinal edges embracing the major portion of said tire and with its opposite ends reduced to form overlapping perforated terminals, and rivets passing through the perforations in the overlapping ends of the shield and provided with intermediate annular shoulders bearing against the adjacent surface of one of said overlapping ends.

In testimony that I claim the foregoing as my own I have hereto affixed my signature in the presence of two witnesses.

ORIN KELLY.

Witnesses:
W. F. EVANS,
D. E. PARRY.